United States Patent
Chen et al.

(10) Patent No.: US 9,599,457 B2
(45) Date of Patent: Mar. 21, 2017

(54) TEAR LINE 3D MEASUREMENT APPARATUS AND METHOD

(71) Applicant: Toyota Motor Engineering & Manufacturing North America, Inc., Erlanger, KY (US)

(72) Inventors: Jing Cong Chen, Kitchener (CA); Karl B. Ziegler, Kitchener (CA); Chi Wai Wong, Kitchener (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 181 days.

(21) Appl. No.: 14/565,284

(22) Filed: Dec. 9, 2014

(65) Prior Publication Data
US 2016/0161246 A1 Jun. 9, 2016

(51) Int. Cl.
*G01B 11/06* (2006.01)
*H04N 13/02* (2006.01)
*B60R 21/2165* (2011.01)

(52) U.S. Cl.
CPC .......... *G01B 11/06* (2013.01); *B60R 21/2165* (2013.01); *H04N 13/0203* (2013.01); *H04N 13/0296* (2013.01)

(58) Field of Classification Search
CPC B60R 21/2165; G01B 11/06; H04N 13/0203; H04N 13/0296; B26D 3/06; B29C 59/007
See application file for complete search history.

(56) References Cited

U.S. PATENT DOCUMENTS

| 6,630,220 B1 * | 10/2003 | Veiga | B32B 27/12 |
| | | | 280/728.1 |
| 7,826,642 B2 * | 11/2010 | Cherkassky | G01N 21/8983 |
| | | | 348/88 |
| 2013/0014627 A1 | 1/2013 | Ito | |
| 2013/0050711 A1 * | 2/2013 | Ertl | A61C 19/00 |
| | | | 356/612 |

FOREIGN PATENT DOCUMENTS

| JP | 2000238603 A | * | 9/2000 |
| JP | 4186622 B2 | | 11/2008 |
| JP | 2011167826 A | | 9/2011 |
| WO | 2010134687 A9 | | 11/2010 |

* cited by examiner

*Primary Examiner* — Francis Gray
(74) *Attorney, Agent, or Firm* — Christopher G. Darrow; Darrow Mustafa PC (57) ABSTRACT

A non-destructive method of measuring tear lines formed in a surface of a resilient automotive trim panel configured for overlaying an inflatable safety device includes the steps of periodically selecting a trim panel for testing from a flow of in-process trim panels, mounting the selected trim panel to a mounting jig configured to support a region of the selected trim panel adjacent a tear line and to temporarily splay said selected trim panel to expose opposed edges forming at least a portion of the tear line, scanning a 3D image of the opposed edges, storing said 3D image as data in an associated processor, and removing the selected trim panel from the mounting jig. The mounting jig includes a base forming upwardly facing longitudinally elongated converging guide surfaces intersecting at a common apex, and a cover member forming downwardly facing longitudinally elongated converging support surfaces intersecting at a common apex.

20 Claims, 5 Drawing Sheets

TEAR LINE 3D MEASUREMENT APPARATUS AND METHOD

TECHNICAL FIELD

The present disclosure relates to measurement systems in general and methods for measuring tear lines integrated within vehicle dashboards and trim panels in particular.

BACKGROUND

It is known that the cover of an airbag system in a dashboard or trim panel of a motor vehicle can be designed as a separate closure member with a hinged connection to the dashboard or trim panel. Such a separate member can correspond in appearance to a petite glove compartment door that is opened from the inside during a crash event by actuation of a related airbag deployment system. The separate member can be manufactured as a discrete subcomponent which is assembled to a host dashboard or trim panel as decorative trim. Such an assembly requires precise, labor intensive alignment to ensure an unobtrusive fit and the retention of the cover with the dashboard or trim panel in the event of an airbag deployment.

There have been attempts to solve this problem by incorporating the airbag cover as an integral part of the dashboard or trim panel wherein an opening line (e.g., tear line) for the airbag is formed in the dashboard or trim panel, eliminating the complexity and cost of a separate closure member. The opening line can be formed by punching or stamping the backing of the dashboard or trim panel out of sheet metal or by reducing the thickness of certain zones in the case of injection molded backings. If the thickness is reduced on the reverse side of the dash board or trim panel, the result is an "invisible" airbag cover.

It is conventional for many applications to produce a line-shaped weakening of material in order to create a predetermined breaking line which can be broken, in case of need, by the application of force in order to separate the adjoining parts of material from one another or to form an opening. It is always advantageous when such predetermined breaking lines have a constant resistance to breaking along their length so that a severing can be effected with constant force. For various applications it is required for technical reasons concerning safety that the braking resistance be predictable in a constant and reproducible manner. One such application, for example, is an airbag cover. For cosmetic reasons, it is also sometimes required that the predetermined breaking line be invisible to the naked eye of the vehicle passengers.

If the advantages of laser machining are to be used for producing such line-shaped weakened portions, it can become difficult to meet the demands for a reproducible, constant breaking resistance. A reproducible, constant breaking resistance essentially requires that the residual wall thickness in the area of the line-shaped weakening be producible in a constant and reproducible manner. This can be achieved by a uniform removal depth, provided the material has a constant thickness.

Methods of material removal with laser radiation are known. According to one approach, the effective laser radiation intensity is regulated by switching the laser on and off depending upon the detected heat radiation, which appears unsuitable for higher machining speeds. In order to improve accuracy, the removal depth is measured and taken into account for correcting limiting values. The measurement of the removal depth can be effected with an optical sensor working on the principle of triangulation. However, the application of this measurement principle is limited to cuts of vertical configuration, cut gap widths greater than the cross section of the measurement beam, and a linear cutting path. Moreover, like other measurement principles which detect removal depth, this measurement principle is not suited to indicate the remaining residual wall thickness if the material thickness is not constant.

Automotive interior trim covering materials such as vinyl and leather are relatively tough and difficult to sever, and also require a predetermined severing pattern for proper door panel opening such that known pre-weakening grooves have been formed in the trim cover in a predetermined pattern to ensure proper opening.

It has been previously proposed to provide an "invisible seam" installation in which the deployment door pattern is totally invisible to a person seated in the vehicle passenger compartment, and even faint outlines or "witness" lines are preferably avoided.

Scoring of the covering layer from the inside, if not done accurately, can over time become at least faintly visible from the exterior of the trim piece.

Fabrication of automotive interior trim pieces with pre-weakening grooving, particularly for invisible seam applications is thus a difficult manufacturing challenge.

First, the groove depth must be carefully controlled in order to achieve reliable rupture of the outer cover at exactly the right time during an air bag deployment event. If the groove is too shallow, the thickness of the remaining material may be too great, presenting excessive resistance to severing, and delaying air bag deployment. Conversely, if too little material remains, cracking may result over time, or at least allow the appearance of externally visible "witness" lines.

The pre-weakening effect may also be less effective if the grooves are molded-in during the process inasmuch as cutting into materials such as vinyl has a better pre-weakening effect compared to molding-in the groove during initial manufacture of the panel.

The high pressures employed during injection molding can cause a "crazing" effect at the thinned bridging material extending over the gap defined by the groove. This crazed zone is rendered more visible as the part is removed from the mold, particularly if the part is not completely cooled when it is being removed. The net effect is that the molded groove becomes visible on the exterior side.

It is difficult to accurately and reliably control the depth of mechanical cutting of component materials such as sheet vinyl and leather, since the material is variable compressed by the pressure of a cutting instrument. One known partial cutting procedure is intended to enable accurate control over the depth of the cut into a sheet of pliant plastic material such as a vinyl skin. However, a purely mechanical cutting operation still has other inherent accuracy limitations and is slow to execute. Also, some cover materials have irregular inside surfaces. For example, dry powder slush processes can create such irregularities. If the groove depth is constant, this results in an irregular thickness of the remaining material, leading to erratic performance as the resistance to opening pressure can vary significantly.

The groove width is also important, in that if a too narrow groove is cut into many plastics, a "self-healing" may occur, particularly at elevated temperatures in which the groove sides will re-adhere to each other, causing the pre-weakening effect to be erratic or neutralized. The required groove width also varies with the notch sensitivity of the material being pre-weakened.

A further difficulty is encountered in assembling the pre-weakened component to the interior trim structure so that the lines of pre-weakening are properly registered with the other components. For example, the vinyl skin in a skin and foam instrument panel must be accurately positioned on the instrument panel substrate and the deployment door substrate panels so that the pre-weakening lines are stressed as the door edges hinge out under pressure from the air bag.

This alignment requirement creates manufacturing difficulties and increased costs particularly since a variety of forms of instrument panel structures are employed, such as skin and foam, vinyl clad, hard plastic with a finished surface, and since a variety of forming techniques are employed, such as vacuum formed calendared plastic sheet, dry powder slush molded, injection molded, and the like. A leather covering may be substituted for the vinyl skin layer.

The criticality of performance of deployment door panels in air bag systems has necessitated extensive ongoing testing of pre-weakening grooves (i.e., tear lines) formed in vehicle trim panels to ensure maintenance of process control and unit-to-unit repeatability. However, known methods of measuring the depth profile of pre-weakening grooves required manual testing by punching out test samples of the trim panel skin selected for testing and manually optically measuring the notch depth in a two dimensional cross-sectional perspective using a standard microscope. This testing regimen is inherently destructive, wherein the trim panel selected for testing must be discarded as scrap.

Accordingly, it is an object of the present disclosure to provide a test apparatus and method enabling non-destructive testing of pre-weakening grooves (i.e., tear lines) formed in vehicle trim panels providing satisfactory groove dimensional data and the ability to return the tested trim panel to the production line.

SUMMARY

According to the present disclosure, a non-destructive method of measuring tear lines formed in a surface of a resilient automotive trim panel includes the steps of mounting a trim panel to a jig configured to support a region of the trim panel adjacent a tear line and to temporarily splay the trim panel to expose edges forming at least a portion of the tear line, scanning a three dimensional (i.e., 3D) image of the exposed edges, storing said 3D image as data in an associated processor, and removing the trim panel from the jig.

According to an embodiment of the description, a non-destructive method of measuring tear lines formed in a surface of a resilient automotive trim panel configured for overlaying an inflatable safety device comprises the steps of periodically selecting a trim panel for testing from a flow of in-process trim panels, mounting the selected trim panel to a mounting jig configured to support a region of the selected trim panel adjacent a tear line and to temporarily splay said selected trim panel to expose edges forming at least a portion of the tear line, scanning a 3D image of the exposed edges, storing the 3D image as data in an associated processor; and removing the selected trim panel from the mounting jig.

According to another embodiment of the disclosure, a mounting jig is configured for supporting a resilient automotive trim panel to enable taking 3D images of tear lines formed in a surface of the trim panel. The mounting jig comprises a base portion forming upwardly facing longitudinally elongated converging guide surfaces intersecting at a common apex, and a cover member forming downwardly facing longitudinally elongated converging support surfaces intersecting at a common apex.

These and other features and advantages of the disclosure will become apparent upon reading the following specification, which, along with the drawings, describes an embodiment of the disclosure in detail.

BRIEF DESCRIPTION OF THE DRAWINGS

The present apparatus will now be described, by way of example, with reference to the accompanying drawings, in which.

Although the drawings represent embodiments of the present apparatus and method, the drawings are not necessarily to scale and certain features may be exaggerated in order to illustrate and explain the present disclosure. The exemplification set forth herein illustrates an embodiment of the apparatus and method, in one form, and such exemplifications are not to be construed as limiting the scope of the present apparatus and method in any manner.

DETAILED DESCRIPTION

In the following Detailed Description, reference is made to the accompanying drawings, which form a part thereof, and in which is shown by way of illustration specific embodiments in which the disclosure may be practiced. In this regard, directional terminology, such as "top", "bottom", "front", "back", "leading", "trailing", etc. is used with reference to the orientation of the Figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. Furthermore, the axes (e.g., ±X, ±Y, and ±Z axes) are referenced on the drawings to provide a relative directional sense only. The following detailed description, therefore, is not to be taken in a limiting sense, and the scope of the present disclosure is defined by the appended claims.

For purposes of providing non-limiting definition and to enable clear understanding of the present disclosure, "longitudinal" means parallel to the direction of the Y axis, "lateral" means parallel to the direction of the X axis, and "vertical" means parallel to the direction of the Z axis.

The present disclosure describes methods for non-destructive three dimensional (i.e., 3D) measurement of tear line thickness for automotive trim panels (e.g., instrument panel). Current testing methods typically require that a portion of the skin of the trim panel containing the tear line be severed and removed for analysis using optical microscopes. The present description utilizes 3D imaging technology to scan the depth of the tear line and generate a 3D image of the tear line. Computer programs may then be employed to measure a height of the cross-section, and this measurement may be used to determine if a part is in dimensional compliance. A cut opening jig is used to position the trim panel skin to allow for 3D imaging.

Referring to FIGS. 1-4, a tear line cut opening jig 10 consists of a base portion 12 and a cover portion 14. As best viewed in FIGS. 1 and 2, the base portion 12 is preferably formed of hardened steel and includes a mounting block 16 suitable for selective attachment to a work table or bench (not illustrated), a riser 18 extending above the mounting block, and a pillar 20 extending above the riser 18. The riser 18 and pillar 20 have successively reduced dimensions contrasted with the mounting block 16. The exposed surfaces of the mounting block 16, riser 18 and pillar 20 which contact a trim panel during testing conditions are coated with a smooth material (not illustrated) such as powder coating to avoid inadvertent scratching, marring or cutting of a test trim panel during the testing process.

Figure 1:
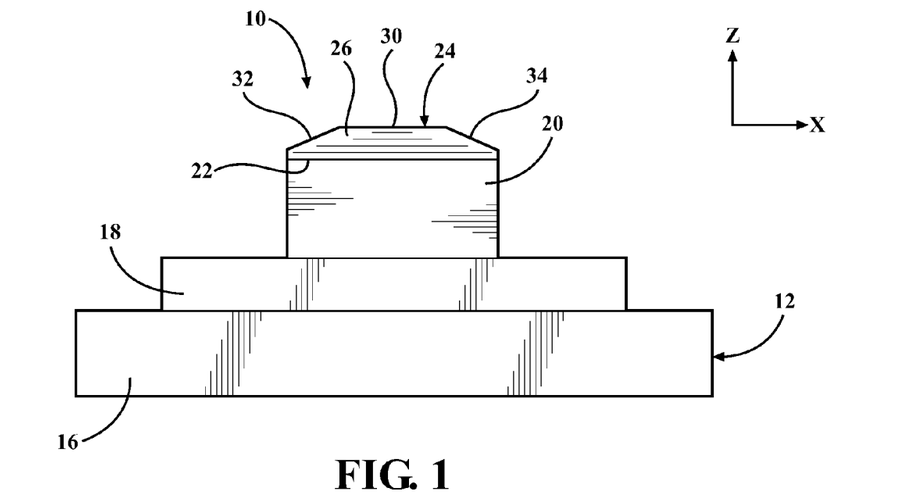
FIG. 1 is a side plan view of the base portion of a tear line cut opening jig.
Figure 2:
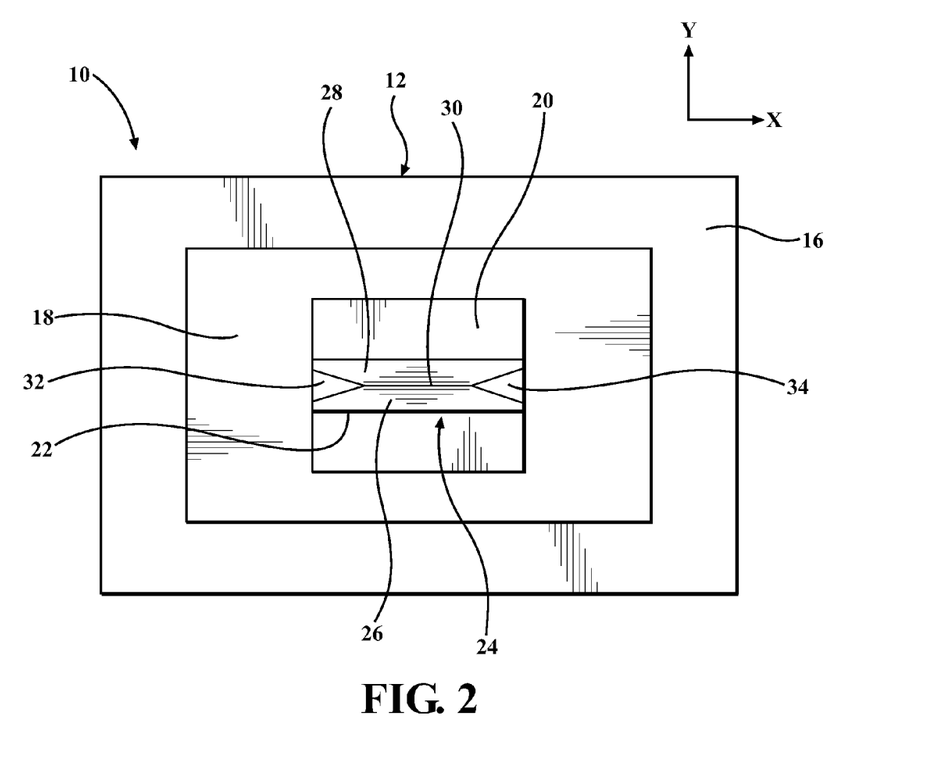
FIG. 2 is a top plan view of the tear line cut opening jig base portion of FIG. 1.

The upper surface 22 of the pillar 20 is surmounted by a compound tapered guide member 24. The guide member 24 is preferable formed of tool steel and is precision finished. The guide member 24 forms cooperating first and second guide surfaces 26 and 28, respectively, which are longitudinally elongated (i.e., along an X axis) and tapered to converge at an apex edge 30. The first and second guide surfaces 26 and 28, respectively, are preferably tapered at a 90° offset, but alternatively can be tapered at an acute or oblique angle depending upon the configuration of the trim panel to be tested. The guide member 24 also forms cooperating first and second tapered end surfaces 32 and 34, respectively, which are longitudinally spaced apart and converge with the apex edge 30 of the guide member 24.

Figure 3:
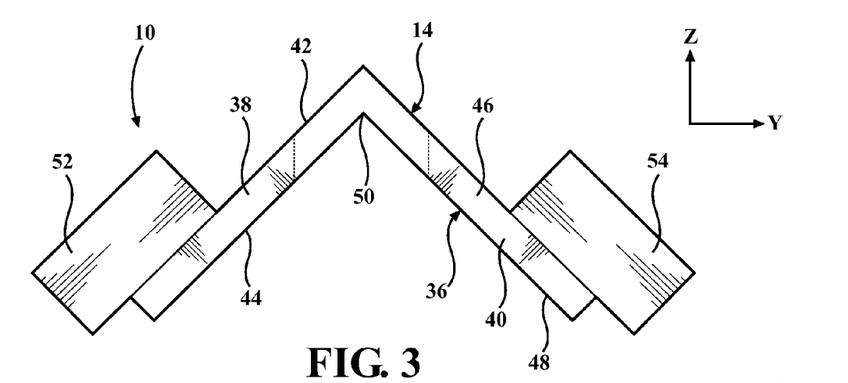
FIG. 3 is a side plan view of a top cover portion of a tear line cut opening jig employed with the base portion of FIGS. 1 and 2.
Figure 4:
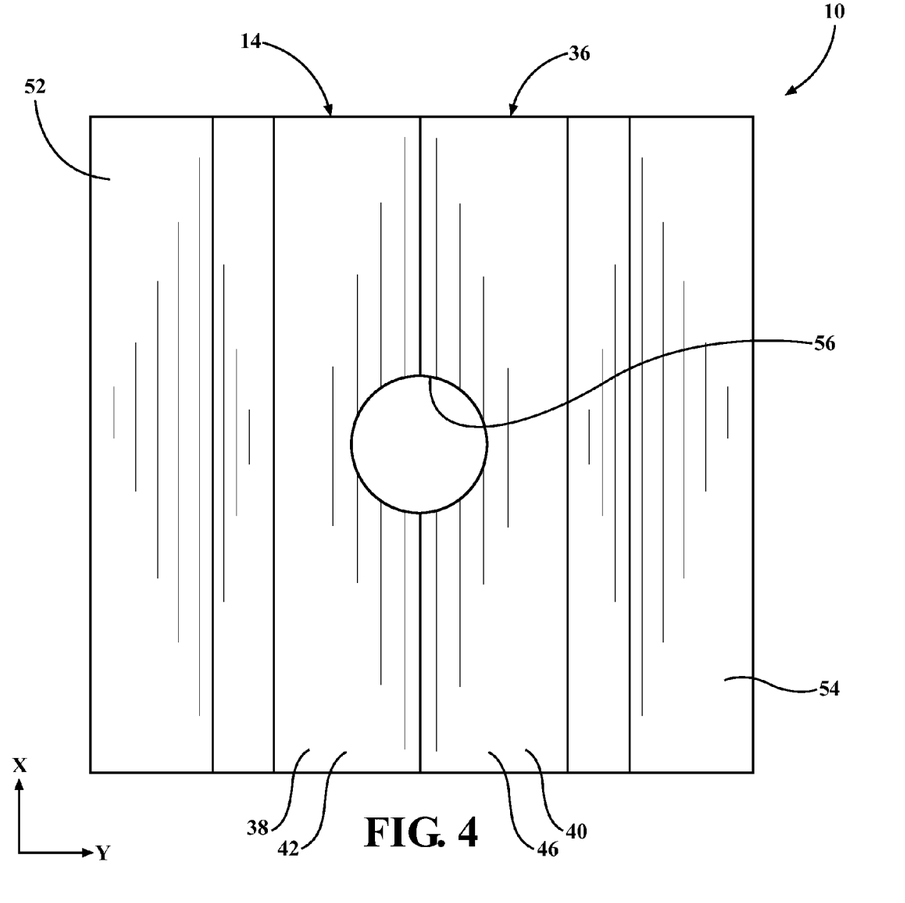
FIG. 4 is a top plan view of the tear line cut opening jig top cover portion of FIG. 3.

As best viewed in FIGS. 3 and 4, the cover portion 14 of the tear line cut opening jig 10 is preferably formed of hardened steel and includes a rigid inverted V-shaped member 36 including first and second side portions (e.g., cantilever arms) 38 and 40, respectively, which, in application, register with the first and second guide surfaces 26 and 28 of the base portion 12 of the tear line cut opening jig 10, respectively. The first side portion 38 has an upper surface 42 and a lower surface 44. The second side portion 40 has an upper surface 46 and a lower surface 48. The lower surface 44 of the first side portion 38 and the lower surface 48 of the second side portion 40, are preferably tapered at a 90° offset, but alternatively can be tapered at an acute or oblique angle depending upon the configuration of the trim panel to be tested. In application, the lower surface 44 of the first side portion 38 of the cover portion 14 should be disposed substantially parallel to the first guide surface 26 of the guide member 24 of the base portion 12 of the tear line cut opening jig 10, and the lower surface 48 of the second side portion 40 of the cover portion 14 should be disposed substantially parallel to the second guide surface 28 of the guide member 24 of the base portion 12 of the tear line cut opening jig 10. The lower surfaces 44 and 48 of the first and second side portions 38 and 40, respectively, converge at an apex edge 50.

First and second weights 52 and 54 are affixed to the free ends of the first and second side portions 38 and 40, respectively. Preferably, the center of mass of the first and second weights 52 and 54 are, in application, located below the apex edge 50 of the cover portion 14 of the tear line cut opening jig 10 to enhance stability during the mounting process.

The cover portion 14 of the tear line cut opening jig 10 also forms a through passage 56 (i.e., viewing port) at its geometric center, bisecting the apex edge 50.

Figure 5:
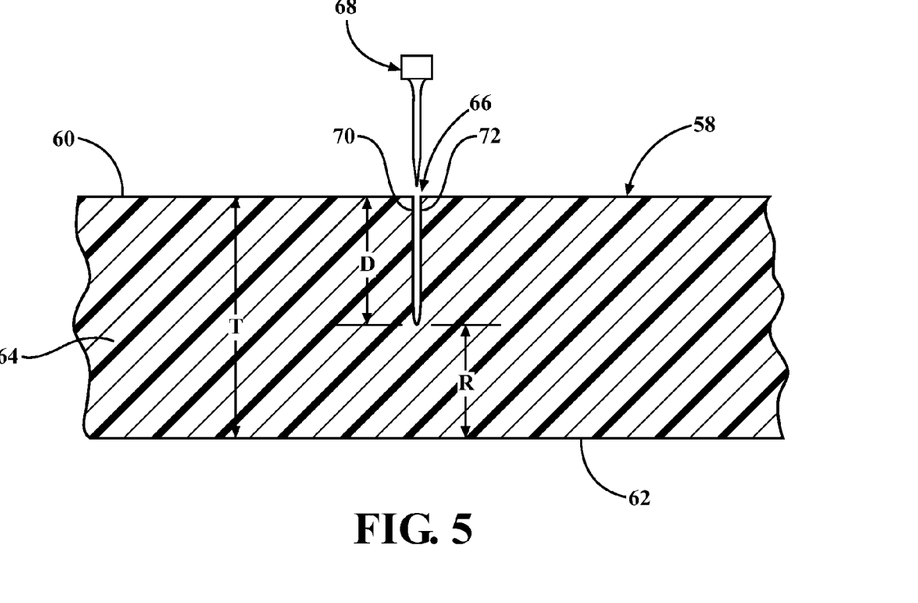
FIG. 5 is a broken, cross-sectional view of a skin (e.g., "slush") portion of an automotive trim panel having a tear line formed therein by a mechanical cutting device.

Referring to FIG. 5, a section of a trim panel skin 58 is illustrated. The trim panel skin 58 is preferably formed of vinyl, leather or the like, and has first and second outer surfaces 60 and 62, respectively, separated by a core 64. In application, one of the outer surfaces 60 or 62 forms a front surface of an automotive trim panel, exposed to the vehicle occupants. The remaining surface forms a rear surface facing away from the vehicle occupants.

A tear line 66 is formed in the first surface 60 of the trim panel skin 60 by a cutting tool 68. The tear line 66 penetrates the first surface 60 and extends partially through the core 64, leaving the second surface 62 intact. The tear line 66 is defined by first and second closely spaced opposed cut edges 70 and 72, respectively. In a trim panel skin 58 having a nominal overall thickness designated "T", the tear line extends into the core a dimension designated "D", leaving an uncut residual core portion designated "R". The tear line can be formed by a manual or automated process. Alternatively, laser cutters can be employed to form the tear line 66. The tear line 66 is typically formed in a surface which, in application, will be hidden from the vehicle occupants.

Figure 6:
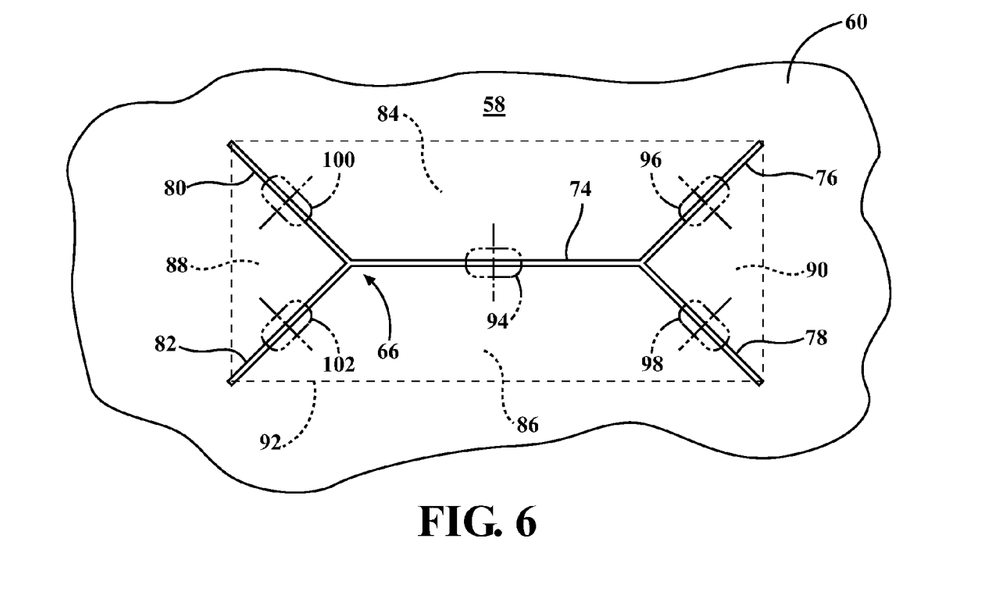
FIG. 6 is a broken, rear plan view of the trim panel of FIG. 5 illustrating the entire tear line in a "dog bone" configuration.

Referring to FIG. 6, one configuration of the tear line 66 is the "dog bone" type consisting of an elongated horizontal center cut 74 bifurcated at one end into first and second diverging end cuts 76 and 78 and bifurcated at an opposed end into third and fourth diverging end cuts 80 and 82. Upon rupturing, such as resulting from activation of an underlying airbag, the cuts 74-82 all rupture along their full lengths to create upper and lower hinged flaps 84 and 86 and left and right hinged flaps 88 and 90, respectively, creating an opening 92 for expelling the air bag into the vehicle passenger compartment.

Prior to installation of the trim panel into a passenger vehicle, the tear line 66 is non-destructively tested to confirm that the depth of the tear line cut "D" as well as the uncut residual thickness "R" are within specifications. This is accomplished by separately measuring the center cut 74 and each end cut 76-82 at a designated test point or region designated 94-102, respectively. Alternatively, it is contemplated that the center cut 74 and each end cut 76-82 may be measured simultaneously, or more than one cut be measured at the same time. Each test point or region 94-102 can be located midway along its respective cut 74-82. Although it is preferred that the test point or region 94-102 is located midway along its respective cut 74-82, it is contemplated that each test point or region 94-102 can be located anywhere along its respective cut 74-82.

Figure 7:
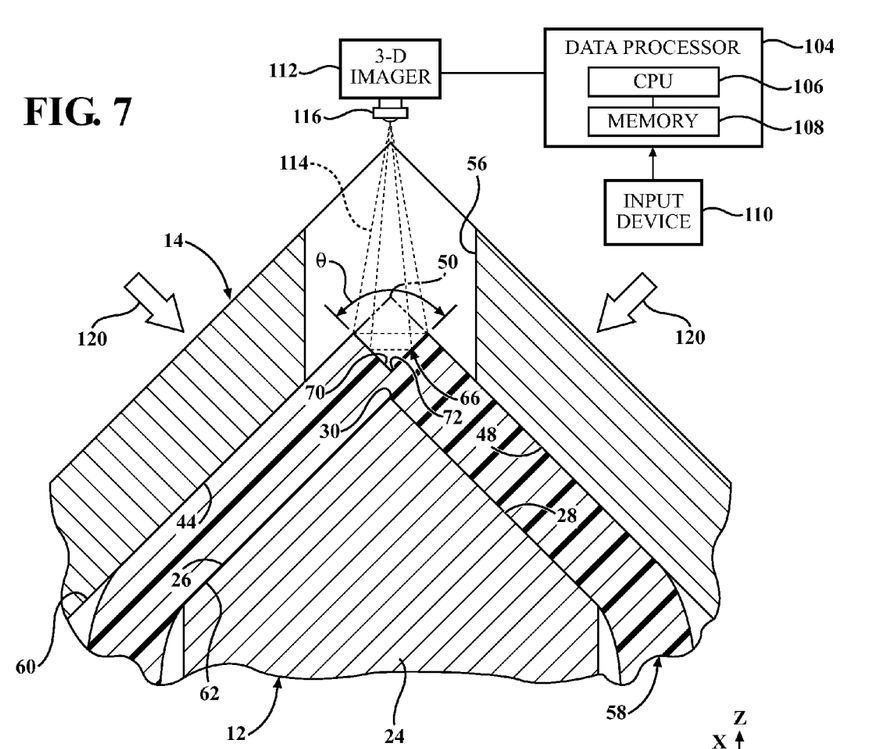
FIG. 7 is a broken, cross-sectional view of the combined base portion of the tear line cut opening jig of FIGS. 1 and 2 and the top cover portion of a tear line cut opening jig of FIGS. 3 and 4, on an enlarged scale, in application with trim panel having a tear line formed therein of FIG. 5, on a reduced scale.

Referring to FIG. 7, dimensional testing of the tear line 66 in the trim panel skin 58 is accomplished employing the following steps:

Periodically select and retrieve a trim panel skin 58 from a flow of in-process trim panels as a candidate for testing.

Record data identifying the trim panel skin 58 selected for testing in an associated data processor 104 containing a central processing unit (i.e., CPU) 106 and memory device 108 through an input device (e.g., keyboard) 110.

Place the trim panel skin 58 over the base portion 12 of the tear line cut opening jig 10 with the first outer surface 60 and the exposed tear line 66 facing upwardly, and in a predetermined rotational orientation.

Mark the test points 94-102 for checking and testing.

Using a depth gauge, such as that commercially available from Keyance, to measure the overall thickness (i.e., "T") at each test point and record the thickness data in the data processor 104.

Align one test point 94-102 of the tear line 66 with the apex edge 30 of the guide member 24 of the base portion 12.

Place the cover portion 14 of the tear line cut opening jig 10 over the exposed surface 60 of the trim panel skin 58 wherein the apex edge 50 of the cover portion 14 registers and is parallel with the apex edge 30 of the guide member 24 of the base portion 12, as well as the portion of the tear line 66 exposed through passage 56. As indicated by arrows 120, the cumulative weight of the cover portion 14 will temporarily fold the region of the tear line 66 under test into conformance with the adjacent guide surfaces 26 and 28 of the guide member 24 of the base portion 12 and the lower surfaces 44 and 48 of the cover portion 14. In so doing, the cut edges 70 and 72 defining the tear line 66 will be splayed open at an angle θ (e.g., approximately 90°) rendering them visible when viewed through the passage 56.

Position a 3D imager 112 over the through passage 53 whereby its field of view 114 registers with the portion of the tear line 66 under test.

Focus a lens 116 of the 3D imager 112 on a predetermined target such as the bottom of the tear line (i.e., where the cut edges 70 and 72 intersect) to establish a first distance marker input.

Focus a lens 116 of the 3D imager 112 on a second predetermined target such as the upper edge of the tear line (i.e., where the cut edges 70 and 72 intersect with the outer surface 60 of the trim panel skin 58) to establish a second distance marker input.

Store the focusing data in the memory 108 of the data processor 104.

Figure 8:
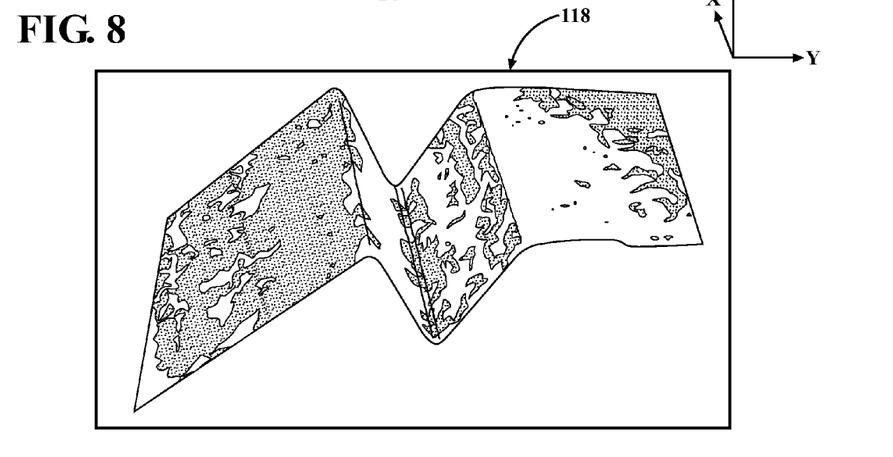
FIG. 8 is a perspective view of a graph (i.e., 3D image) of data scanned depicting the height, depth and surface contours of a tear line at one test point.

Select an auto 3D mode setting of the 3D imager 112 to create a digital image 118 as illustrated in FIG. 8. The image 118 depicts a portion of the tear line 66 at one of the test points 94-102 in a splayed condition as well as portions of the first outer surface 60 adjacent the first and second cut edges 70 and 72 of the trim panel skin 58.

Store the image 118 in the memory 108 of the data processor 104.

Repeat the previously recited steps for each of the remaining test points 94-102.

Return the tested trim panel skin 58 to the flow of in-process trim panels for subsequent installation in a motor vehicle.

Large sample size test data has confirmed that in the comparison of the destructive notch test and the non-destructive 3D test in all three checks (i.e., total skin thickness, tear line cut depth and residual skin thickness) at the five test locations, the "gap" (i.e., improvement) is consistent with the 3D test method. The data cross reference shows that the 3D microscope measurement is capable to match the destructive test result with consistent offset (e.g., average=0.072 and deviation=0.008) during a larger sample size (e.g., number of test pieces=53). The results of the cross reference trial verify the capability and accuracy of the new (i.e., non-destructive 3D microscope measurement) method compared to the traditional (i.e., destructive notch) test.

Figure 9:
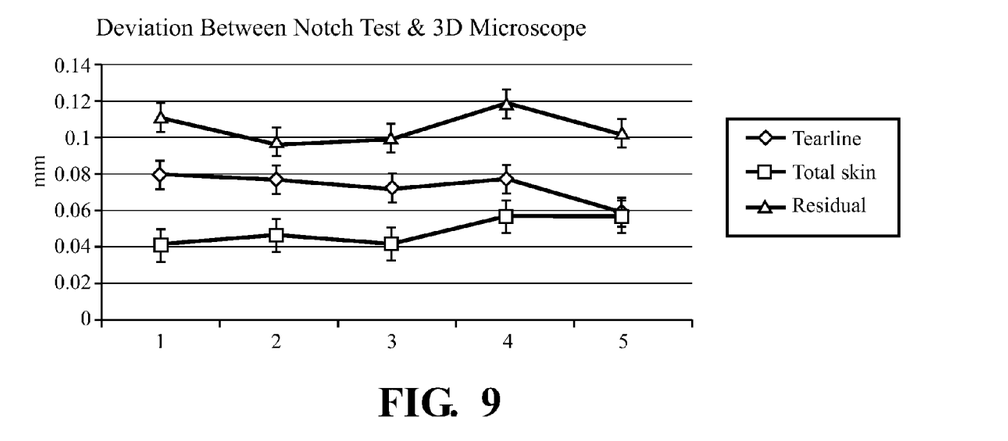
FIG. 9 is chart of test data depicting the deviation of the "gap" between the destructive notch test and the non-destructive 3d test including tear line dimension (i.e., T), residual dimension and total skin dimension (i.e., T) at each of the five test points.

FIG. 9 is chart of test data depicting the deviation of the "gap" between the destructive notch test and the non-destructive 3D test including tear line dimension (i.e., T), residual dimension and total skin dimension (i.e., T) at each of the five test points. The "gap" is consistent and with minimum deviation.

Figure 10:
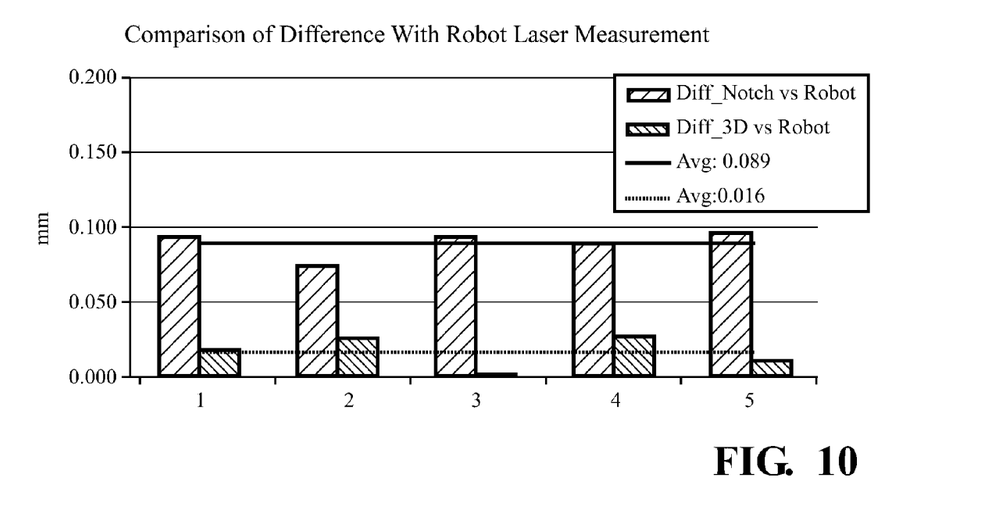
FIG. 10 is chart of residual thickness test data depicting the difference between destructive notch test and the non-destructive 3d test.

FIG. 10 is chart of residual thickness test data depicting the difference between the destructive notch test and the non-destructive 3D test. Specifically, the 3D residual thickness data is 0.09 mm higher than the notch test and is on the high side of the control limit (e.g., 0.65 mm). This condition may provide an early warning indication of any abnormality of the robot cut when the residual skin is too thick as a safety issue in air bag applications. The result of residual thickness from 3D measurement is very close to robot measurement from the tear line machine (avg. Δ=0.018 mm), which means the overcutting (low side of control limit (e.g., 0.4 mm) rarely occurs.

It is to be understood that the present apparatus and method has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The present apparatus and method has been described in an illustrative manner, and it is to be understood that the terminology, which has been used is intended to be in the nature of words of description rather than of limitation.

Obviously, many modifications and variations of the present disclosure are possible in light of the above teachings. It is, therefore, to be understood that within the scope of the appended claims, wherein reference numerals are merely for illustrative purposes and convenience and are not in any way limiting, the present apparatus and method, which is defined by the following claims as interpreted according to the principles of patent law, including the Doctrine of Equivalents, may be practiced otherwise than is specifically described.

The invention claimed is:

1. A non-destructive method of measuring tear lines formed in a surface of a resilient automotive trim panel configured for overlaying an inflatable safety device, said method comprising the steps of:
  periodically selecting a trim panel for testing from a flow of in-process trim panels;
  mounting said selected trim panel to a mounting jig to support a region of said trim panel adjacent a tear line and temporarily splay said trim panel and thereby increase an angle between opposed edges forming at least a portion of said tear line;
  scanning a 3D image of said opposed edges of said tear line;
  storing said 3D image as data in an associated processor; and
  removing said selected trim panel from said mounting jig.

2. The non-destructive method of measuring tear lines of claim 1, wherein said selected trim panel comprises a front surface and a rear surface, and wherein said tear line is formed in said rear surface and extends inwardly toward said front surface.

3. The non-destructive method of measuring tear lines of claim 1, wherein said selected trim panel comprises a front surface and a rear surface, and wherein said tear line is formed in said front surface and extends inwardly toward said rear surface.

4. The non-destructive method of measuring tear lines of claim 1, wherein said step of mounting said selected trim panel to said mounting jig includes increasing said angle between said opposed edges of said tear line to an acute angle.

5. The non-destructive method of measuring tear lines of claim 1, wherein said step of mounting said selected trim panel to said mounting jig includes increasing said angle between said opposed edges of said tear line to an oblique angle.

6. The non-destructive method of measuring tear lines of claim 1, wherein said step of mounting said selected trim panel to said mounting jig comprises mounting a predetermined region of said selected trim panel to said mounting jig, wherein said predetermined region of said selected trim panel is disposed adjacent said tear line.

7. The non-destructive method of measuring tear lines of claim 1, wherein said mounting jig comprises a base portion forming upwardly facing guide surfaces intersecting at a base portion apex, and wherein said step of mounting said selected trim panel comprises the step of:

positioning said selected trim panel over said base portion of said mounting jig with said tear lines facing upwardly and aligned with and above said base portion apex.

8. The non-destructive method of measuring tear lines of claim 7, wherein said mounting jig further comprises a cover portion forming downwardly facing support surfaces intersecting at a common apex, and wherein said step of mounting said selected trim panel comprises the step of:

positioning said mounting jig cover portion over said selected trim panel with said tear lines aligned with and positioned below said cover portion apex, whereby a portion of said selected trim panel positionally conforms between said base portion guide surfaces and said cover portion support surfaces exposing said opposed edges of said tear line.

9. The non-destructive method of measuring tear lines of claim 8, wherein said mounting jig cover portion further comprises a through passage registering with said opposed edges of said tear line, and said step of mounting said selected trim panel comprises the step of:

positioning a 3D imager over said mounting jig cover portion and aligned with said through passage in line of sight with said opposed edges of said tear line.

10. The non-destructive method of measuring tear lines of claim 9, further comprising the step of:

focusing said 3D imager on at least one predetermined target positioned between said opposed edges of said tear line.

11. The non-destructive method of measuring tear lines of claim 6, further comprising the of step of de-mounting, repositioning and re-mounting said selected trim panel to said mounting jig configured to support a second region of said selected trim panel adjacent said tear line.

12. A non-destructive method of measuring tear lines formed in a surface of a resilient automotive trim panel, said method comprising the steps of:

mounting a trim panel to a mounting jig to support a region of said trim panel adjacent a tear line and temporarily splay said trim panel and thereby increase an angle between opposed edges forming at least a portion of said tear line;

scanning a 3D image of said opposed edges;

storing said 3D image as data in an associated processor; and removing said trim panel from said jig.

13. A mounting jig configured for supporting a resilient automotive trim panel to enable taking 3D images of tear lines formed in a surface of said trim panel, said mounting jig comprising:

a base portion forming upwardly facing longitudinally elongated converging guide surfaces intersecting at a common apex; and a cover portion forming downwardly facing longitudinally elongated converging support surfaces intersecting at a common apex.

14. The mounting jig of claim 13 wherein said base portion further forms upwardly facing laterally extending tapered end surfaces.

15. The mounting jig of claim 13, wherein said converging guide surfaces and converging support surfaces are juxtaposed at common acute angles.

16. The mounting jig of claim 13, wherein said converging guide surfaces and converging support surface are juxtaposed at common oblique angles.

17. The mounting jig of claim 13, wherein said cover portion further comprises a viewing port laterally aligned with both said apices.

18. The mounting jig of claim 13, wherein said cover portion has an inverted V configuration including cantilevered arms extending laterally outwardly from said common apex of said cover portion.

19. The mounting jig of claim 18, wherein said cover portion further comprises cooperating weights carried by said cantilevered arms.

20. The mounting jig of claim 19, wherein said base portion is constructed of ferrous material and said cooperating weights have centers of mass located below said common apex of said cover portion.

* * * * *

UNITED STATES PATENT AND TRADEMARK OFFICE
CERTIFICATE OF CORRECTION

PATENT NO. : 9,599,457 B2  
APPLICATION NO. : 14/565284  
DATED : March 21, 2017  
INVENTOR(S) : Chen et al.

Page 1 of 1

It is certified that error appears in the above-identified patent and that said Letters Patent is hereby corrected as shown below:

In the Specification

Column 4, Line 37: replace "destructive 3d" with -- destructive 3D --  
Column 4, Line 42: replace "destructive 3d" with -- destructive 3D --  
Column 10, Line 9: replace "jig configured to support" with -- jig to support --

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*